United States Patent
Harbuzaru et al.

(10) Patent No.: US 7,056,490 B2
(45) Date of Patent: Jun. 6, 2006

(54) IM-11 CRYSTALLINE SOLID WITH STRUCTURE TYPE LTA, AND A PROCESS FOR ITS PREPARATION

(75) Inventors: Bogdan Harbuzaru, Lyons (FR); Jean-Louis Paillaud, Mulhouse (FR); Joël Patarin, Flaxlanden (FR); Nicolas Bats, Pomeys (FR); Laurent Simon, Lyons (FR); Catherine Laroche, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 31 days.

(21) Appl. No.: 10/902,425

(22) Filed: Jul. 30, 2004

(65) Prior Publication Data

US 2005/0058596 A1     Mar. 17, 2005

(30) Foreign Application Priority Data

Jul. 30, 2003  (FR) .................................. 03 09410

(51) Int. Cl.
*C01B 37/00* (2006.01)

(52) U.S. Cl. .................... 423/713; 423/326; 423/594.9; 423/618; 423/DIG. 24; 423/706; 423/708; 502/242; 502/349

(58) Field of Classification Search ................ 423/326, 423/594.9, 618, 713, DIG. 24, 706, 708; 502/242, 349

See application file for complete search history.

(56) References Cited

U.S. PATENT DOCUMENTS

| 5,082,641 A | 1/1992 | Popa et al. |
| 5,518,707 A | 5/1996 | King et al. |
| 5,968,473 A | 10/1999 | Valencia et al. |
| 5,968,474 A | 10/1999 | Nakagawa et al. |

FOREIGN PATENT DOCUMENTS

| EP | 0292363 | 11/1998 |
| EP | 1010667 | 6/2000 |
| WO | WO 9634827 | 11/1996 |

OTHER PUBLICATIONS

Corma, Avelino et al: "A large-cavity zeolite with wide pore windows and potential as an oil refining catalyst" Nature (London, United Kingdom), 418, 514-517 Coden: Natuas; ISSN: 0028-0836, 2002, pp. 514-517, XP002276873.

Gabelica Zelimir et al: "Silicogermanate with a Si: Ge ratio >=2-an MFI zeolite of novel composition" Jan. 1989, Angew Chem (Int Ed Engl) Jan. 1989, vol. 28, NR. 1, pp. 81-83, XP002276614.

Schreyeck Laurence et al: Diaza-polyoxa-macrocycle 'Kryptofix222' as a new template for the synthesis of LTA-type AlPO4. Co-templating role of F<-> and/or (CH3)4N<+> ions: Microporous Mesoporous Mater; Microporous and Mesoporou7s Materials Jun. 17, 1998 Elsevier Sci B.V., Amsterdam, Netherlands vol. 22, No. 1-3 Jun. 17, 1998 pp. 87-106, XP002276874.

*Primary Examiner*—David Sample
(74) *Attorney, Agent, or Firm*—Millen, White, Zelano & Branigan, P.C.

(57) ABSTRACT

The invention concerns a IM-11 crystalline solid with structure type LTA, with a neutral framework, having a chemical composition expressed as the anhydrous base in terms of moles of oxide defined by the general formula $XO_2:mYO_2:qR:sF$, in which R represents one or more nitrogen-containing organic compounds, X represents one or more tetravalent elements other than germanium, Y represents germanium, F is fluorine, m, q, s represent the number of moles of $YO_2$, R and F respectively, m is in the range 0.1 to 4, and q and s are in the range 0 to 1.

20 Claims, No Drawings

IM-11 CRYSTALLINE SOLID WITH STRUCTURE TYPE LTA, AND A PROCESS FOR ITS PREPARATION

FIELD OF THE INVENTION

The present invention relates to a novel microporous crystalline solid with structure type LTA, with a neutral framework, containing germanium and at least one tetravalent element other than germanium, hereinafter termed IM-11. It also relates to a process for preparing said IM-11 solid and to the use of said solid as an absorbent.

PRIOR ART

The development of novel microporous molecular sieves has led over recent years to the synthesis of a wide variety of aluminosilicates with a zeolitic structure. Such solids are characterized by their chemical composition, the diameter of the pores they contain and the shape and geometry of their microporous system.

A certain number of solid zeolites synthesized over the past forty years have allowed considerable advances in the fields of adsorption and catalysis. Examples that can be cited are Y zeolites (United States patent U.S. Pat. No. 3,130,007) and ZSM-5 zeolite (U.S. Pat. No. 3,702,886). The number of novel molecular sieves, encompassing zeolites, which are synthesized every year, is constantly increasing. A more complete description of the different molecular sieves can be obtained from the work entitled "Atlas of zeolite structure types", Ch. Baerlocher, W M Meier and D H Olson, Fifth Revised Edition, 2001, Elsevier. The following can be cited: NU-87 zeolite (U.S. Pat. No. 5,178,748), MCM-22 zeolite (U.S. Pat. No. 4,954,325) or gallophosphate with structure type CLO (U.S. Pat. No. 5,420,279) or the zeolites ITQ-12 (U.S. Pat. No. 6,471,939), ITQ-13 (U.S. Pat. No. 6,471,941), CIT-5 (U.S. Pat. No. 6,043,179), ITQ-21 (International patent application WO-02/092511) and ITQ-24 (R Castenada et al, J Am Chem Soc, 2003, 125, 7820).

Some of the zeolites cited above have been synthesized in a fluoride medium in which the mobilizing agent is not the usual hydroxide ion but a fluoride ion in a process initially described by J L Guth et al (Proc Int Zeol Conf Tokyo, Aug. 17–22, 1986, p 121). The pH of the synthesis media was typically close to neutrality. One advantage of such fluorine-containing reaction systems is to allow the production of purely siliceous zeolites containing fewer defects than zeolites obtained in a traditional strongly basic medium (J M Chézeau et al, Zeolites 1991, 11, 598). A further decisive advantage of using fluorine-containing reaction media is to allow the production of novel framework topologies containing double cycles of four tetrahedra, as is the case with ITQ-7, ITQ-13 and ITQ-17 zeolites. Further, the use of germanium in said synthesis media also encourages the production of such a framework, as is the case with ITQ-21. A zeolite (Linde type A), an aluminosilicate prepared in a basic medium and with structure type LTA (T B Reed and D W Breck, J Am Chem Soc, 1956, 78, p 5972) also contains double cycles of four tetrahedra. The aluminosilicate framework of A zeolite carries negative charges located near the aluminous tetrahedra ($AlO_4^-$), said negative charges being compensated by a compensating cation, frequently a sodium ion. The highest Si/Al ratio for a crystalline solid with structure type LTA is obtained in the case of LZ-215 zeolite (U.S. Pat. No. 4,503,023) using an aluminium substitution process starting from a N-A type zeolite (R M Barrer, J. Chem. Soc 1961, p 971), using a solution of fluorosilicate salts.

The aim of the present invention is to propose a novel crystalline solid with structure type LTA, preferably a germanosilicate, with a neutral framework. The solid of the invention has the advantage of having pores that are free of compensating cations, which are necessarily present in zeolitic solids having a negatively charged framework, for example in A zeolite. The absence of compensating cations renders the available pore volume higher, which is particularly advantageous for applications of the solid of the invention in adsorption processes. The solid of the invention also has the advantage of having a satisfactory thermal stability.

DESCRIPTION OF THE INVENTION

The present invention provides a novel IM-11 crystalline solid with structure type LTA, with a neutral framework, having a chemical composition expressed as the anhydrous base in terms of moles of oxide defined by the general formula $XO_2:mYO_2:qR:sF(I)$, in which R represents one or more nitrogen-containing organic compounds, X represents one or more tetravalent elements other than germanium, Y represents germanium, F is fluorine, m, q, s represent the number of moles of $YO_2$, R and F respectively, m is in the range 0.1 to 4, and q and s are in the range 0 to 1. The solid IM-11 with structure type LTA of the invention has an X ray diffraction diagram which includes at least the lines shown in Table I.

In accordance with the invention, the framework of solid IM-11 is neutral: it does not carry any charge as elements X and Y defined above are tetravalent. More precisely, the framework of the IM-11 solid of the invention is locally and globally neutral since the positive charges of the elements X and Y exactly compensate the negative charges of the oxygen atoms present at the peak of the tetrahedral in the crystalline structure.

The X ray diffraction diagram is obtained by radiocrystallographic analysis using a diffractometer, using the conventional powder technique using the copper K$\alpha$1 line ($\lambda$=1.5406 Å). Starting from the position of the diffraction peaks represented by the angle 2$\theta$, the Bragg relationship is used to calculate the characteristic interplanar spacings $d_{hkl}$ of the sample. The error in measurement $\Delta(d_{hkl})$ over $d_{hkl}$ is calculated from the Bragg relationship as a function of the absolute error $\Delta(2\theta)$ in the measurement of 2$\theta$. An absolute error $\Delta(2\theta)$ of ±0.2° is normally allowable. The relative intensity $I_{rel}$ for each value of $d_{hkl}$ is measured from the height of the corresponding diffraction peak. The X ray diffraction diagram of the crystalline solid IM-11 of the invention includes at least the lines with the $d_{hkl}$ values given in Table 1. The $d_{hkl}$ column shows the mean values for the interplanar spacings in angstroms (Å). Each of these values has a measurement error $\Delta(d_{hkl})$ in the range ±0.2 Å to ±0.008 Å.

TABLE I

Mean values for $d_{hkl}$ and relative intensities measured for an X ray diffraction diagram for the IM-11 crystalline solid of the invention

| $d_{hkl}$ (Å) | 2 theta (°) | $I/I_0$ |
| --- | --- | --- |
| 12.07 | 7.32 | S |
| 8.53 | 10.36 | mw |
| 6.98 | 12.68 | VS |
| 6.03 | 14.66 | vw |
| 5.40 | 16.40 | vw |
| 4.27 | 20.76 | w |
| 4.03 | 22.05 | m |
| 3.82 | 23.24 | vw |

TABLE I-continued

Mean values for $d_{hkl}$ and relative intensities measured for an X ray diffraction diagram for the IM-11 crystalline solid of the invention

| $d_{hkl}$ (Å) | 2 theta (°) | $I/I_0$ |
|---|---|---|
| 3.64 | 24.42 | mw |
| 3.35 | 26.59 | vw |
| 3.23 | 27.60 | w |
| 2.93 | 30.47 | w |
| 2.85 | 31.40 | vw |
| 2.64 | 33.97 | vw |
| 2.58 | 34.79 | w |
| 2.47 | 36.38 | vw |
| 2.42 | 37.17 | vw |
| 2.37 | 37.91 | vw |
| 2.33 | 38.68 | vw |
| 2.01 | 44.97 | vw |
| 1.96 | 46.25 | vw |
| 1.89 | 48.17 | vw |
| 1.86 | 48.78 | vw |
| 1.84 | 49.43 | vw |

In which VW = very strong; m = mean; w = weak; S = strong; mw = medium weak; vw = very weak.

The relative intensity $I/I_0$ is given as a relative intensity scale to which the value of 100 is given to the most intense line on the X ray diffraction diagram: vw<15; 15≦w<30; 30≦mw<50; 50≦m<65; 65≦S<85; VS≧85.

The crystalline solid IM-11 of the invention has a crystalline structure with structure type LTA the framework of which is neutral. The crystalline structure of the crystalline solid IM-11 of the invention is a three-dimensional structure formed by tetrahedra. In particular, it comprises units of the double cycle with four tetrahedra type.

Advantageously, the ratio Ge/X of the framework of the crystalline solid IM-11 of the invention is in the range 0.3 to 3, preferably in the range 0.3 to 2. Preferably, m is in the range 0.2 to 3 and more preferably, m is in the range 0.5 to 2. The values of q and s are in the range 0 to 1, advantageously in the range 0.01 to 1, more advantageously in the range 0.1 to 0.9 and still more advantageously in the range 0.6 to 0.9.

In accordance with the invention, X is preferably selected from silicon, tin and titanium. Preferably, X is silicon; the crystalline solid IM-11 of the invention is thus a metallosilicate, more precisely a germanosilicate, which is crystalline with an X ray diffraction diagram identical to that shown in Table 1.

In the case in which the crystalline solid IM-11 of the invention is in its as synthesized form, i.e. directly from synthesis and prior to any calcining step that is known to the skilled person, said solid IM-11 comprises at least one organic nitrogen-containing compound as described below or its decomposition products, or its precursors. In its as synthesized form, the compound(s) R present in formula (I) is/are at least partially, and preferably entirely, said organic nitrogen-containing compound(s). In a preferred embodiment of the invention, R is the compound with formula 4,7,13,16,21,24-hexaoxa-1,10-diazabicyclo[8.8.8]hexacosane with trade name Kryptofix® 222 (Aldrich) in the case in which the crystalline solid IM-11 is in the as synthesized form. The Kryptofix® 222 acts as an organic template. The template can be eliminated in a controlled manner using conventional prior art techniques such as heat and/or chemical treatments. In a further preferred mode of the invention, the Kryptofix® 222 is mixed with a further chemical species, preferably an alkaline cation, for example sodium, in the case in which the solid IM-11 is in its as synthesized form.

The crystalline solid IM-11 of the invention is preferably a zeolitic solid. The invention also concerns a process for preparing a crystalline solid IM-11 in which an aqueous mixture comprising at least one source of at least one oxide $XO_2$, optionally at least one source of oxide $YO_2$, and optionally at least one source of an oxide $M_{2/w}O$, and at least one organic nitrogen-containing compound R or one of its organic nitrogen-containing precursors or one of its decomposition products is reacted, the mixture generally having the following molar composition:

| | |
|---|---|
| $M_{2/w}O/(XO_2 + YO_2)$ | 0 to 3, preferably 0 to 1, more preferably 0.01 to 1; |
| $H_2O/(XO_2 + YO_2)$ | 1 to 50, preferably 2 to 30; |
| $R/(XO_2 + YO_2)$ | 0.1 to 3, preferably 0.1 to 1; |
| $F/(XO_2 + YO_2)$ | 0.1 to 3, preferably 0.1 to 1; |
| $YO_2/XO_2$ | 0 to 1, preferably 0.2 to 1, more preferably 0.2 to 0.7; |
| $L_aS/XO_2$ | 0 to 0.5, preferably 0 to 0.3 | in which X is one or more tetravalent elements other than germanium, preferably silicon, Y is germanium, M is a cation with valency w which may comprise an alkali metal and/or ammonium cation, $L_aS$ is a salt, S being an anion with valency a and L being an alkali metal or ammonium ion which may be similar to M or a mixture of M and another alkali metal ion or an ammonium ion necessary to balance the anion S, S possibly comprising an acid radical added, for example, in the form of a salt of L or an aluminium salt. The cation M employed is preferably an alkali metal, in particular sodium. An example of S which can be cited is a strong acid radical such as a bromide, chloride, iodide, sulphate, phosphate or nitrate, or a weak acid radical such as an organic acid radical, for example a citrate or acetate. While $L_aS$ is not essential, it may accelerate crystallization of the solid IM-11 of the invention from the reaction mixture and it may also affect the size and shape of the crystals constituting the solid IM-11. In all cases, the reaction is carried out until crystallization occurs.

The fluorine can be introduced either in the form of alkali metal or ammonium salts, such as NaF, $NH_4F$, $NH_4HF_2$ or in the form of hydrofluoric acid or in the form of hydrolysable compounds which can liberate fluorine anions in water, such as silicon fluoride $SiF_4$ or ammonium fluorosilicate $(NH_4)_2SiF_6$ or sodium fluorosilicate $Na_2SiF_6$.

In accordance with the process of the invention, R is an organic nitrogen-containing template. Preferably, R is the organic nitrogen-containing compound with formula 4,7,13,16,21,24-hexaoxa-1,10-diazabicyclo[8.8.8]hexacosane (Kryptofix® 222), one of its derivatives, or at least one precursor of Kryptofix® 222 or at least one decomposition product of Kryptofix® 222.

Cation M can be added in the form of hydroxides or salts of mineral acids provided that the ratio $M_{2/w}O/(XO_2+YO_2)$ is satisfied.

The source of element X can be any compound comprising element X and which can liberate said element in aqueous solution in the reactive form. Advantageously, when element X is silicon, the source of the silicon can be any of those routinely used in zeolite synthesis, for example solid powdered silica, silicic acid, colloidal silica, dissolved silica or tetraethoxysilane (TEOS). Powdered silicas which can be used include precipitated silicas, in particular those obtained by precipitation from a solution of an alkali metal silicate, such as aerosil silicas, pyrogenated silicas, for example "CAB-O-SIL", and silica gels. Colloidal silicas with different particle sizes can be used, for example with a mean equivalent diameter in the range 10 to 15 mm or between 40 and 50 mm, such as those sold under the trade mark "LUDOX". Dissolved silicas which can be used also comprise commercially available soluble glass silicates containing 0.5 to 6.0, n particular 2.0 to 4.0 moles of $SiO_2$ per mole of alkali metal oxide, "active" alkali metal silicates such as those defined in British patent GB-A-1 193 254, and silicates obtained by dissolving silicon in an alkali metal hydroxide or a quaternary ammonium hydroxide, or a mixture thereof. Preferably, the silicon source is TEOS.

The source of the oxide $YO_2$ is a germanium oxide $GeO_2$, for example.

In accordance with a preferred implementation of the process of the invention, an aqueous mixture comprising silica, a germanium oxide, hydrofluoric acid and Kryptofix® 222 is reacted.

The process of the invention consists of preparing an aqueous reaction mixture known as a gel and comprising at least one source of at least one oxide $XO_2$, optionally at least one source of the oxide $YO_2$, optionally at least one source of the oxide $M_{2/w}O$ and at least one organic nitrogen-containing organic compound R, or at least one precursor of an organic nitrogen-containing compound or at least one of its decomposition products. The quantities of said reagents are adjusted to endow this gel with a composition that allows its crystallization into a crystalline solid IM-11 with formula $XO_2:mYO_2:qR:sF$, in which m, q and s satisfy the criteria given above. The gel then undergoes hydrothermal treatment until the crystalline solid IM-11 is formed. The hydrothermal conditions to which the gel is subjected are advantageously applied under autogenous reaction pressure, optionally adding a gas, for example nitrogen, at a temperature in the range 120° C. to 200° C., preferably in the range 140° C. to 180° C., and more preferably at a temperature which does not exceed 175° C. until crystals of solid IM-11 of the invention are formed. The time necessary to obtain crystallization is generally between 1 hour and several months, depending on the composition of the reagents in the gel, the stirring and the reaction temperature. The reaction is generally carried out with stirring or in the absence of stirring, preferably in the presence of stirring.

It may be advantageous to add seeds to the reaction mixture to reduce the time required for the formation of nuclei and/or the total crystallization period. It may also be advantageous to use seeds to encourage the formation of the crystalline solid IM-11 to the detriment of the impurities. Said seeds comprise crystalline solids, in particular crystals of solid IM-11. The crystalline seeds are generally added in a proportion in the range 0.01% to 10% of the weight of the oxide $XO_2$, preferably silica, used in the reaction mixture.

At the end of the reaction, the solid phase is filtered and washed; it is then ready for subsequent steps such as drying, dehydration and calcining to eliminate any absorbed organic substances present in the pores of the solid IM-11. The operating conditions for eliminating the organic template are temperature and atmosphere-controlled calcining conditions. The solid is initially heated in an inert atmosphere for a period in the range 1 to 6 hours at a temperature in the range 100° C. to 300° C. This atmosphere can be obtained using a stream of nitrogen, for example. It is then calcined in an inert atmosphere at a temperature in the range 400° C. to 700° C. for a period of at least 4 hours. The atmosphere in the vessel is then replaced by an atmosphere containing oxygen to allow combustion of the products formed during the step for calcining in an inert atmosphere.

When the IM-11 solid of the invention is freed of organic template, the values of q and s are preferably zero.

The present invention also concerns the use of said solid IM-11 as an adsorbent.

Preferably, said solid IM-11 is freed of the organic template when it is used as an adsorbent. When used as an adsorbent, the crystalline solid IM-11 of the invention is generally dispersed in an inorganic matrix phase which contains channels and cavities which allow the fluid to be separated access to the crystalline solid. Such matrices are preferably mineral oxides, for example silicas, aluminas, silica-aluminas or clays. The matrix generally represents between 2% and 25% by weight of the adsorbent thus formed.

The invention will now be illustrated using the following examples.

EXAMPLE 1

Preparation of a Crystalline Solid IM-11 in Accordance with the Invention 7 ml of water was mixed with 6.535 g of Kryptofix® 222 (K222, Aldrich) and 1.454 g of amorphous germanium oxide (Aldrich) in a polypropylene beaker, with stirring. After dissolving the oxide with stirring, 4.339 g of tetraethoxysilane (Aldrich) was added. The ethanol and excess water were evaporated off at ambient temperature and with stirring until a mass of 14.969 g was obtained. 0.869 g of 40% by weight hydrofluoric acid in water (Fluka) was then added and stirring was continued until a homogeneous paste had formed. The gel was then transferred into a Teflon shell which was then placed in a 20 millilitre autoclave.

The molar composition of the corresponding gel was:
$0.6SiO_2:0.4GeO_2:0.5K222:0.5HF:10H_2O$ The autoclave was heated at 170° C. in an oven for 4 days. During synthesis, the autoclave was stirred constantly; the longitudinal axis of the autoclave was rotated at a speed of about 15 rpm in a plane perpendicular to the axis of rotation. The pH for synthesis was close to 7. After filtering, the product was washed with distilled water and dried at 70° C. The dried product was analyzed by X ray powder diffraction and identified as being constituted by zeolitic IM-11 solid with structure type LTA.

Chemical analysis of the product by X ray fluorescence was carried out and provided a $SiO_2/GeO_2$ ratio of 2.11.

EXAMPLE 2

Preparation of a Crystalline Solid IM-11 in Accordance with the Invention 8 ml of water was mixed with 6.276 g of Kryptofix® 222 (K222, Aldrich) and 0.698 g of amorphous germanium oxide (Aldrich) in a polypropylene beaker, with stirring. After dissolving the oxide with stirring, 5.555 g of tetraethoxysilane (Aldrich) was added. The ethanol and excess water were evaporated off at ambient temperature and with stirring until a mass of 14.074 g was obtained. 0.833 g of 40% by weight hydrofluoric acid in water (Fluka) was then added and stirring was continued until a homogeneous paste had formed. The gel was then transferred into a Teflon shell which was then placed in a 20 millilitre autoclave.

The molar composition of the corresponding gel was:
$0.8SiO_2:0.2GeO_2:0.5K222:0.5HF:101H_2O$ The autoclave was heated at 170° C. in an oven for 4 days. During synthesis, the autoclave was stirred constantly; the longitudinal axis of the autoclave was rotated at a speed of about 15 rpm in a plane perpendicular to the axis of rotation. The pH for synthesis was close to 7. After filtering the product was washed with distilled water and dried at 70° C. The dried product was analyzed by X ray powder diffraction and identified as being constituted by zeolitic IM-11 solid with structure type LTA.

Chemical analysis of the product by X ray fluorescence was carried out and provided a $SiO_2/GeO_2$ ratio of 2.99.

EXAMPLE 3

Preparation of an Adsorbant Containing an IM-11 zeolitic Crystalline Solid

The solid used was the as synthesized solid of Example 1 comprising the organic template 4,7,13,16,21,24-hexaoxa-1,10-diazabicyclo[8.8.8]hexacosane (Kryptofix® 222).

This solid initially underwent heating in a stream of nitrogen at a temperature of 200° C. for 4 hours then was calcined, still in a nitrogen atmosphere, at 550° C. for 8 hours. Following these initial treatments, the solid obtained was calcined at 550° C. for 8 hours in a stream of air then a further 8 hours in a stream of oxygen.

The solid obtained was then formed into extrudates by mixing with boehmite (Pural SB3, Sasol) in a Z arm mixer and extruding the paste obtained with a piston extruder. The extrudates were dried at 120° C. for 12 h in air and calcined at 550° C. for 2 hours in a stream of air in a muffle furnace.

The prepared adsorbent was composed of 80% of zeolitic solid IM-11 and 20% of alumina.

The adsorbent may adsorb compounds from gases and also from liquids. It can adsorb some hydrocarbon compounds (those of higher molecular weight being preferentially adsorbed inside a single family of compounds) from a mixture of hydrocarbons and optionally hydrogen. It may also adsorb some impurities with hetero-atoms such as O, S, N (e.g. water, NH3, mercaptans and other sulfided hydrocarbons) from a mixture of hydrocarbon compounds and optionally hydrogen.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 03/09.410, filed Jul. 30, 2003 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A IM-11 crystalline solid with structure type LTA, with a neutral framework, having a chemical composition expressed as the anhydrous base in terms of moles of oxide defined by the general formula $XO_2:mYO_2:qR:sF(I)$, in which R represents one or more nitrogen-containing organic compounds, X represents one or more tetravalent element(s) other than germanium, Y represents germanium, F is fluorine, m, q, s represent the number of moles of $YO_2$, R and F respectively, m is in the range 0.1 to 4, and q and s are in the range 0 to 1.

2. A IM-11 crystalline solid according to claim 1, in which the ratio Ge/X is in the range 0.3 to 3.

3. A IM-11 crystalline solid according to claim 2, in which q and s are in the range 0.1 to 0.9.

4. A IM-11 crystalline solid according to claim 2, in which m is in the range 0.2 to 3.

5. A IM-11 crystalline solid according to claim 4, in which q and s are in the range 0.1 to 0.9.

6. A IM-11 crystalline solid according to claim 5, in which X is silicon.

7. A IM-11 crystalline solid according to claim 6, in which R is a compound with formula 4,7,13,16,21,24-hexaoxa-1,10-diazabicyclo[8.8.8]-hexacosane.

8. A IM-11 crystalline solid according to claim 1, in which m is in the range 0.2 to 3.

9. A IM-11 crystalline solid according to claim 8, in which q and s are in the range 0.1 to 0.9.

10. IM-11 crystalline solid according to claim 1, in which q and s are in the range 0.1 to 0.9.

11. A IM-11 crystalline solid according to claim 1, in which X is silicon.

12. A IM-11 crystalline solid according to claim 1, in which R is a compound with formula 4,7,13,16,21,24-hexaoxa-1,10-diazabicyclo[8.8.8]-hexacosane.

13. A process for preparing a crystalline solid IM-11 according to claim 1, comprising mixing at least one source of at least one oxide $XO_2$, optionally at least one source of an oxide $YO_2$, optionally at least one source of an oxide $M_{2/w}O$, and at least one organic nitrogen-containing compound R, or at least one precursor of an organic nitrogen-containing compound or at least one decomposition product of an organic nitrogen-containing compound, then carrying out a hydrothermal treatment of said mixture until said crystalline solid IM-11 is formed.

14. A process for preparing a crystalline solid IM-11 according to claim 13, in which the molar composition of the reaction mixture is such that:

| | |
|---|---|
| $M_{2/w}O/(XO_2 + YO_2)$ | 0 to 3; |
| $H_2O/(XO_2 + YO_2)$ | 1 to 50; |
| $R/(XO_2 + YO_2)$ | 0.1 to 3; |
| $F/(XO_2 + YO_2)$ | 0.1 to 3; |
| $YO_2/XO_2$ | 0 to 1; |
| $L_aS/XO_2$ | 0 to 0.5. |

15. A process according to claim 14, in which the source of the oxide $YO_2$ is a germanium oxide $GeO_2$.

16. A process according to claim 13, in which seeds are added to the reaction mixture.

17. A process according to claim 13, in which the source of the oxide $YO_2$ is a germanium oxide $GeO_2$.

18. An adsorbent comprising a crystalline adsorbent according to claim 1 optionally with a binder or carrier.

19. In a method of adsorbing at least one compound from a gas or liquid, the improvement wherein the adsorbent is according to claim 18.

20. In a method of adsorbing at least one compound from a gas or liquid, the improvement wherein the adsorbent is according to claim 12.

* * * * *